Sept. 28, 1954  R. H. COWLES  2,690,001
METHOD OF AND APPARATUS FOR ASSEMBLING AN ELASTIC TUBULAR
RUBBER INSERT UNDER RADIAL COMPRESSION BETWEEN
A RIGID OUTER TUBE AND AN INNER RIGID CORE
Filed Nov. 26, 1948  3 Sheets-Sheet 1
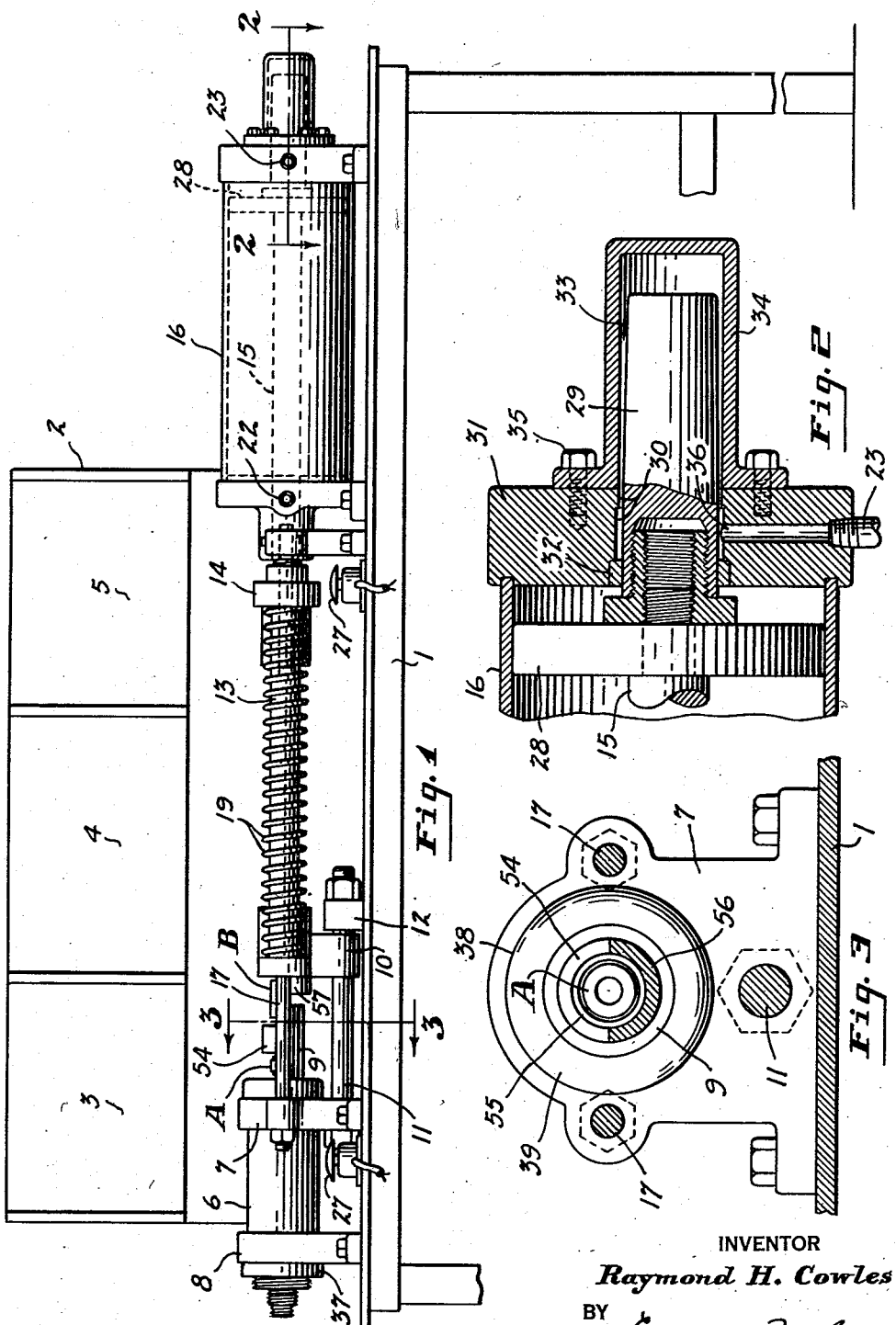
INVENTOR
Raymond H. Cowles
BY Evans + McCoy
ATTORNEYS

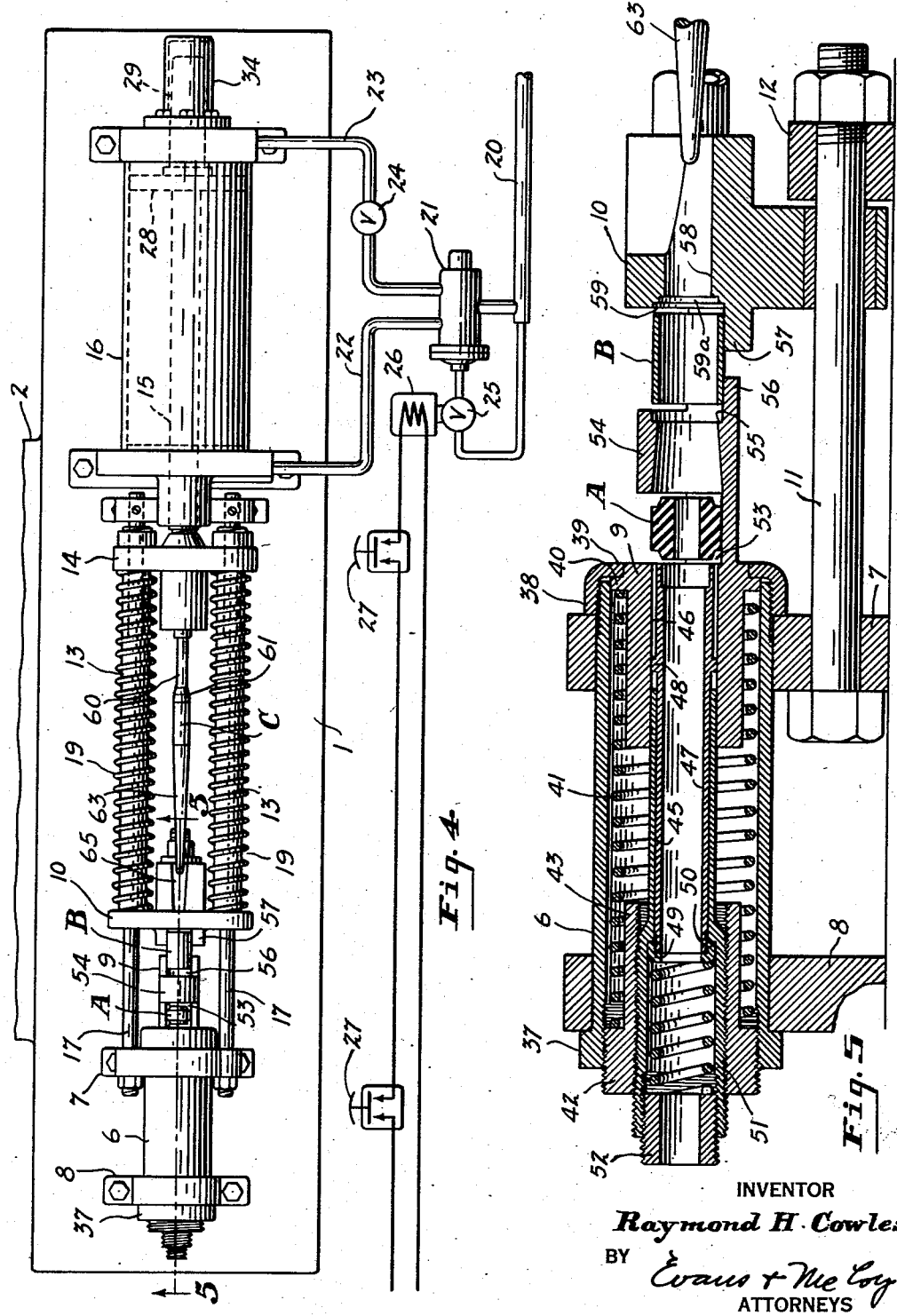

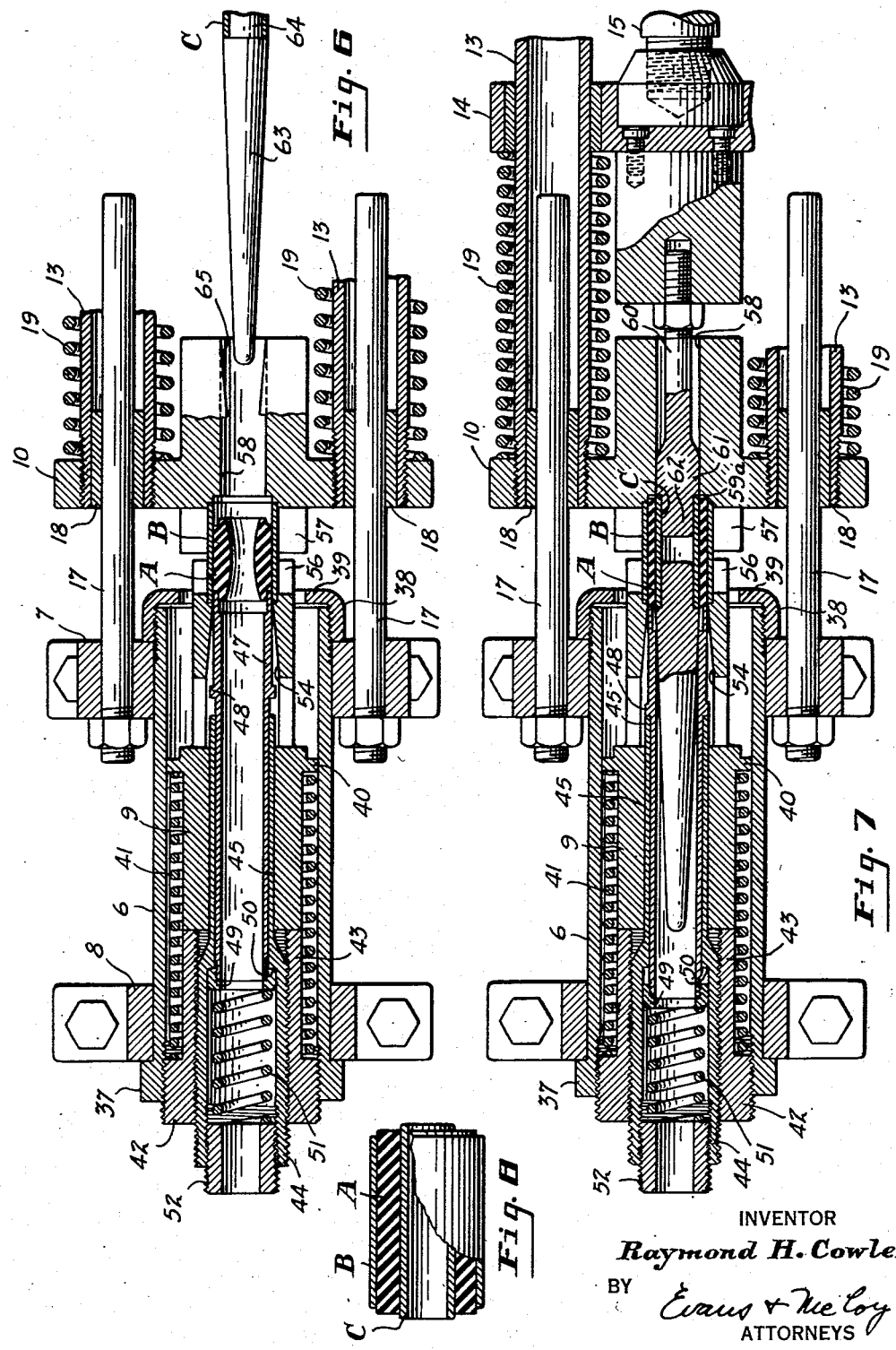

Patented Sept. 28, 1954

2,690,001

UNITED STATES PATENT OFFICE 2,690,001

METHOD OF AND APPARATUS FOR ASSEMBLING AN ELASTIC TUBULAR RUBBER INSERT UNDER RADIAL COMPRESSION BETWEEN A RIGID OUTER TUBE AND AN INNER RIGID CORE

Raymond H. Cowles, Wabash, Ind., assignor to The General Tire and Rubber Company, Akron, Ohio, a corporation of Ohio Application November 26, 1948, Serial No. 62,072

11 Claims. (Cl. 29—149.5)

This invention relates to a method of and apparatus for assembling an elastic tubular rubber insert under radial compression between a rigid outer tube and an inner rigid core to form an elastically yieldable unit for use in articulated joints, vibration-dampening supports and the like.

The invention has for its object to provide a rapid and economical method of assembly, by which the elastic insert is forced into the outer tube and the core forced into the insert with a relatively small expenditure of power.

A further object of the present invention is to provide a method of assembly which reduces the percentage of assemblies that are defective by reason of distortion of the rubber insert.

It is also an object of the present invention to provide a machine by means of which the entire assembling operation is effected by a single stroke of an operating ram.

With the above and other objects in view, the invention may be said to comprise the method and apparatus hereinafter described, together with such variations and modifications thereof as will be apparent to one skilled in the art to which the invention pertains.

Reference should be had to the accompanying drawings forming a part of this specification, in which:

Figure 1 is a front elevation of a machine embodying the invention;

Fig. 2 is a fragmentary horizontal section taken on the line indicated at 2—2 in Fig. 1;

Fig. 3 is a fragmentary vertical section taken on the line indicated at 3—3 in Fig. 1;

Fig. 4 is a top plan view of the machine;

Fig. 5 is a fragmentary vertical section taken on the line indicated at 5—5 in Fig. 4;

Fig. 6 is a fragmentary horizontal section through the portion of the machine shown in Fig. 5, showing the parts in the positions they occupy at the time the rubber insert has been entered into the outer tube;

Fig. 7 is a section like that shown in Fig. 6, showing the parts in the positions which they occupy when the assembly is completed; and Fig. 8 is a sectional view showing the completed assembly.

The cushioning unit that is assembled by the method and apparatus herein disclosed is composed of a tubular rubber insert A, an outer rigid tube B, and an inner tubular core C.

The tubular rubber insert A is formed of an elastic rubber composition and is of an external diameter materially greater than the internal diameter of the outer rigid tube B. The internal diameter of the rubber insert A is of a diameter materially less than the external diameter of the core C, so that in the completed assembly shown in Fig. 8, the elastic insert A is under substantial radial compression between the outer rigid tube B and the core C. The expansive pressure of the rubber on the interior of the tube B and upon the exterior of the core C serves to firmly bind the outer tube and core to the rubber insert without the aid of adhesives.

The assembling apparatus of the present invention is mounted upon a suitable support, such as a table 1, and to the rear of the table there is mounted a receptacle 2 having compartments 3, 4 and 5 for rubber inserts A, outer tubes B and tubular cores C. Adjacent one end of the table there is mounted a horizontally disposed cylindrical housing 6 that is fixedly secured to spaced standards 7 and 8 carried by the table 1.

An axially movable slide 9 is mounted in the housing 6 and projects from the inner end of the housing. Opposite the inner end of the slide 9 a crosshead 10 is slidably mounted on a guide rod 11 that is secured at one end to the standard 7 and at its opposite end to a short post 12 secured to the table. The crosshead 10 has a pair of laterally spaced tubular guide rods 13 rigidly attached thereto, and these guide rods are parallel to guide rod 11 and are slidably received in a crosshead 14 that is attached to a piston rod 15 projecting from a fluid pressure cylinder 16 mounted on the table 1 at the end thereof opposite that upon which the housing 6 is mounted. The crosshead 10 is guided by an additional pair of guide rods 17 parallel to the rod 11 that are attached at their outer ends to the standards 7 upon opposite sides of the housing 6, and which project through the crosshead 10 into the tubular guide rods 13, suitable bearing sleeves 18 being provided in the tubular rods 13 to slidably receive the rod 17. Relatively stiff coil springs 19 surround the guide rods 13 and are interposed between the crossheads 10 and 14. The crosshead 14 is moved toward the crosshead 10 by means of a fluid pressure cylinder 16, and thrust is transmitted to the crosshead 10 through the coil springs 19.

The cylinder 16 is preferably operated by air pressure, which is delivered thereto from a line 20 extending to a suitable source of pressure, and the delivery of air from the line 20 to the inner and outer ends of the cylinder 16 is controlled by a suitable valve 21 that is connected to the line 20 and through lines 22 and 23 to the inner and outer ends of the cylinder, a suitable regulating valve 24 being provided in the line 23 by means of which the rate of inward movement of the piston rod 15 may be regulated. The valve 21 is normally biased to a position in which the inner end of the cylinder 16 is connected to the pressure line 20 through the valve 21 and is adapted to be operated by air pressure to a position connecting the pressure line 20 to the outer end of the cylinder through the lines 23, the delivery of air under pressure from the line 20 to the control valve 21 being controlled by a normally closed valve 25 that is adapted to be opened by means of a solenoid 26.

The entire assembling operation is performed by a single reciprocating stroke of the piston rod 15, and this operation is effected by means of a pair of palm switches 27 that are in series with one another and with the solenoid 26, so that when the two switches are simultaneously held closed by the operator, pressure is delivered to the outer end of the cylinder 16. When the switches 27 are released and permitted to open, the solenoid is deenergized, the valve 25 is closed, and the pressure line 20 is again connected to the inner end of the cylinder 16. The switches 27 are spaced apart sufficiently to require the operator to use both hands to close them, and, since it is necessary for the operator to use both hands to hold the switches 27 closed during the assembling operation, the operator is protected against injury.

The cylinder 16 has a piston 28 that is provided with an extension 29 of reduced diameter that extends through an opening 30 in the outer head 31 of the cylinder. A sealing ring 32 is provided in the opening 30 to receive the inner portion of the piston extension 29 and to form a seal against passage of air into the cylinder during the initial portion of the stroke of the piston and the extension 29 has a tapering outer end portion 33 that permits passage of air past the sealing ring 32 during the final portion of the piston stroke. The extension 29 is received in an auxiliary pressure chamber formed by a cup-shaped member 34 attached by suitable means such as bolts 35 to the head 31, the open end of the member 34 being in registry with the opening 30 in the head to form an extension of the cylinder 16. The pipe line 23 communicates with the opening 30 through a port 36 outwardly of the sealing ring 32, so that when the piston 28 is near the outer end of its stroke air under pressure is delivered into the extension 34 and acts only upon the reduced extension 29 of the piston so that a relatively light pressure is applied to the piston during the initial portion of its inward travel. When the tapered portion 33 of the piston extension reaches the sealing ring 32, air under pressure is permitted to pass into the main cylinder 16 after which pressure is exerted upon the entire area of the piston to increase the force exerted thereon during the final portion of the stroke.

As best shown in Figs. 5, 6 and 7, the cylindrical housing 6 has a flange 37 at its outer end that engages the outer face of the standard 8 and is provided with a nut 38 at its inner end that engages the inner face of the standard 7 to rigidly secure the housing 6 in fixed position. The nut 38 has an annular inwardly projecting flange 39 that extends into the path of a circumferential rib 40 on the slide 9 to limit the inward movement of the slide. The periphery of the rib 40 has a sliding fit within the cylindrical housing 6 and the slide 9 is normally held in its innermost position by means of a coil spring 41 that surrounds the slide 9 within the housing 6 and is interposed between the rib 40 and the head 42 of a tubular stop member 43 that is adjustably mounted in the outer end of the housing. The head 42 provides an abutment for the outer end of the spring 41, and the inner end of the tubular stop member 43 is in the path of the slide 9 to limit the outward movement thereof.

Mounted for axial adjustment within the tubular stop member 43, there is a tubular guide member 44 that has an inner portion 45 of reduced diameter that slidably fits within an axial bore 46 in the slide 9. The reduced portion 45 of the tubular guide member 44 telescopically receives a tubular plunger 47 that projects beyond the inner end of the guide portion 45 and has an external rib 48 that slidably fits within the bore 46 of the slide 9. The outward movement of the tubular plunger 47 is limited by engagement of the rib 48 with the inner end of the tubular guide 45. The outer end of the tubular plunger 47 has a collar 49 attached thereto that has a sliding fit in the outer end portion of the guide member 44 and this collar is engageable with a shoulder 50 on the interior of the tubular guide 44 to limit the inward movement of the plunger 47. The plunger 47 is normally held in its innermost position by means of a coil spring 51 interposed between the collar 49 and an axially adjustable stop sleeve 52 mounted within the outer end of the guide member 44.

The springs 41 and 51 normally hold the slide 9 and the tubular plunger 47 in the position shown in Fig. 5 of the drawings. The portion of the slide 9 which projects beyond the inner end of the tubular housing 6 in the innermost position of the slide is provided with a concave seating portion 53 which is adapted to support the tubular rubber insert A in axial alinement with the tubular plunger. Inwardly of the seat 53 a funnel guide 54 is formed integrally with the slide 9 in axial alinement with the tubular plunger 47. The large end of the funnel 54 faces the housing 6 and is of a diameter substantially corresponding to the external diameter of the tubular insert A, while the small end of the funnel 54 is of a diameter substantially corresponding to the internal diameter of the tube B. At the inner end of the funnel the slide 9 is provided with a counterbore 55 in which the tube B is adapted to fit, and the slide 9 has a projecting portion providing a concave seat 56 to receive one end of the tube B. The seat 56 is a continuation of the wall of the counterbore 55 so that a tube resting on the seat can slide into the counterbore 55 when it is pressed toward the slide 9 by the crosshead 10. The crosshead 10 is provided with a projecting portion forming a concave seat 57 that is alined with the seat 56. When the parts are in the position shown in Fig. 5, a tube B can be placed on the seats 56 and 57 between the crosshead 10 and the guide 9 in axial alinement with the funnel 54. The crosshead 10 is provided with a bore 58 that is in axial alinement with the funnel 54, the bore 58 being of a diameter to permit passage of a tubular core C through the crosshead 10. The inner face of the crosshead 10 is provided with a counterbore 59 in which the tube B is adapted to fit and into which an end of the tube B enters when the crosshead 10 is advanced toward the slide 9, and with a second counterbore 59a which provides a stop for limiting the axial flow of rubber when the insert A is subjected to radial compression. During the assembling operation the tube B is clamped between the slide 9 and crosshead 10 with its opposite end in the counterbores 55 and 59 which serve to positively retain the tube B in axial alinement with the funnel 54 and in registry with the small end of the funnel.

As best shown in Fig. 7, a plunger rod 60 is detachably secured to the crosshead 14 and projects inwardly from said crosshead in axial alinement with the bore 58 and the funnel 54. The plunger rod 60 has a head portion 61 that is of an external diameter corresponding to the external diameter of the core 2 and of a size to slidably fit in the bore 58 of the crosshead 10. The head 61 has an extension 62 of reduced diameter that is of a size to fit within a tubular core C and of a length to provide a rigid support for the tubular core C on the plunger rod.

For entering the tubular core into an elastic insert A previously positioned within the tube B, an elongated, tapered core pilot 63 is provided. The pilot 63 is tapered from its inner end to an outer end portion having the same diameter as the external diameter of the tubular core C and the large end of the pilot has a cylindrical extension 64 of a diameter to fit within the core tube C, so that the core tube C and pilot 63 may be supported upon the plunger 60. As shown in Figs. 4 and 6, the outer portion of the crosshead 10 is provided with a slot 58 extending from the top thereof to the bore 58 to facilitate the assembly of a core tube C and a pilot 63 on the plunger 60. Upon advance of the crosshead 14 toward the crosshead 10 the pilot 63 guides the core C and head 61 into the bore 58 which serves to hold the pilot against lateral movements during its passage through the rubber insert within the tube B.

In the operation of the machine the operator takes a tubular insert A from the compartment 3 of the supply receptacle 2 and places it on the seat 53, and an outer tube B from the compartment 4 and places it on seats 56 and 57, as shown in Fig. 5. The operator then takes an inner tubular core C from the compartment 5, places it upon the extension 64 at the large end of the pilot 63, and then places the tube C on the extension 62 of the plunger 60. The pilot 63 and tubular core C are thus supported in axial alinement with the tube B, insert A, funnel 54 and tubular plunger 45. After so placing the insert A, tube B and core C, the operator depresses the palm switches 27 to advance the piston rod 15 and the crosshead 14.

During the initial portion of the stroke the piston 28 is moved by pressure exerted upon the extension 29 and the crosshead 10 is advanced by the springs 19, which are initially stressed to an extent such that they will not yield until the crosshead 10 has advanced to its limit of movement. The spring 41 yields under substantially less pressure than the springs 19 so that as the crosshead 10 advances toward the housing 6 the tube B is first clamped between the crosshead 10 and funnel 54 after which the slide 9 is moved outwardly in the housing 6 against the pressure of its spring 41. As the slide 9 moves outwardly within the housing 6, the spring 51 retains the tubular plunger 47 in fixed position so that outward movement of the slide 9 causes the insert A to be pushed by the funnel 54 against the inner end of the tubular plunger 47, causing the insert to be advanced through the funnel 54 into the tube B, the initial tension of the spring 51 being sufficient to hold the plunger 47 against movement until the slide 9 has moved to its outermost position in engagement with the tubular stop 43, thereby positioning the insert A within the outer tube B as shown in Fig. 6 of the drawings. When the crosshead 10 reaches the position shown in Fig. 6, the slide 9 is at its outermost limit of movement and the crosshead 10 is held against further movement.

At this portion of the cycle of operations the tapered portion 33 of the piston extension 29 will have been moved to a position to admit air under pressure to the interior of the cylinder 16 to apply a greatly increased force to the crosshead 14, which then compresses the springs 19 and advances the crosshead 14 toward the crosshead 10. During the advanced movement of the crosshead 14, the tapered core pilot 63 enters the bore 58 of the crosshead 10 and guides the tubular core C and the head 61 of the plunger rod 60 into the bore 58. During this advancing movement the core pilot 63 enters the insert A positioned within the outer tube B as shown in Fig. 6, and passes through the insert into the tubular plunger 47, and the tube C passes behind the pilot 60 through the bore 58 into place within the insert A. During the movement of the pilot and the core tube through and into the rubber insert A, the rubber of the insert is subjected to radial pressure which causes it to flow axially in both directions within the outer tube B. Axial flow toward the crosshead 10 is limited by the counterbore 59a and axial flow in the opposite direction applies pressure to the tubular plunger 47, causing the plunger to be moved outwardly against the pressure of its spring 51 until the rib 48 engages the end of the tubular guide 45, as shown in Fig. 7, the rib 48 being positioned to stop the outward movement of the plunger 47 at a point where its inner end properly positions the end of the insert A in engagement therewith. The stroke of the piston 15 is such that the core tube C is properly positioned with respect to the insert A and the outer tube B at the inner end of the stroke.

Upon completion of the stroke of the piston rod 15 and crosshead 14 the operator releases the palm switches 27 and the piston 28 is automatically returned to its outermost position and the slide 9, plunger 47 and crosshead 10 are returned by their springs to their initial positions shown in Fig. 5. The completed assembly can then be removed and the parts assembled for another operation.

By entering the insert A into one end of the tube B by axially applied pressure and then entering the core tube C into the insert from the opposite end of the tube B, the assembly operation is performed with a minimum expenditure of power and the assembly is accomplished with a minimum distortion of the rubber insert A since stresses set up in the insert A by the entering operation are to a considerable extent relieved by the movement of the pilot and core member in the opposite direction through the insert. It has been found that the amount of pressure required to enter the core into an insert previously placed within an outer tube is very substantially reduced by entering the core from the end of the outer tube opposite that into which the insert was originally entered.

Although the invention may be employed in various ways, only preferred embodiments have been illustrated and described. Other embodiments may be made within the invention as provided by the patent statutes.

What I claim is:

1. The herein described method of assembling a tubular elastic rubber insert between an outer rigid tube of an internal diameter materially less than the normal external diameter of the insert and an internal rigid core which comprises radially contracting said insert and applying thereto an axial thrust to force the same into one end of said tube, and immediately forcing said core by axial pressure into the insert so positioned within the tube from the end of the tube opposite that into which the insert was forced.

2. The herein described method of assembling a tubular elastic rubber insert between an outer rigid tube of an internal diameter materially less than the normal external diameter of the insert and a rigid core of an external diameter greater than the normal internal diameter of the insert which comprises radially contracting said insert and forcing the same by axially applied pressure into said tube, sliding the insert within the tube to space the same from the end of the tube into which it was entered, forcing said core by axially applied pressure into said insert from the end of said tube opposite that into which the insert was entered, and limiting axial movement of the insert toward the end of the tube into which it was entered.

3. Apparatus for assembling an elastic tubular rubber insert within an outer rigid tube and around an inner rigid core comprising a support, an open ended guide funnel carried by said support, means for clamping an insert receiving tube to the small end of the funnel in axial alinement therewith, a plunger on the side of said funnel toward which the large end of said funnel faces, said plunger being axially alined with the funnel and advanceable into the large end of the funnel and through the same to force an insert through the funnel into said tube, a second plunger axially alined with the first and on the opposite side of said support, said second plunger being movable axially relative to the first toward and away from the same and toward said tube to force a core into an insert within the tube, means for advancing the first plunger through the funnel to force an insert into said tube and for holding said first plunger in engagement with the insert and means for thereafter reciprocating said second plunger to enter the core within the insert while the insert is engaged by said first plunger.

4. Apparatus for assembling an elastic tubular rubber insert within an outer rigid tube and around an inner rigid core comprising a support, an open ended guide funnel carried by said support, means for clamping an insert receiving tube to the small end of the funnel in axial alinement therewith, a plunger on the side of said funnel toward which the large end of said funnel faces, said plunger being axially alined with the funnel and advanceable into the large end of the funnel and through the same to force an insert through the funnel into said tube, a second plunger axially alined with the first and on the opposite side of said support, said second plunger having means for supporting a core in axial alinement therewith and being movable axially relative to the first toward and away from the same and toward said tube to force the core into the insert within the tube, means for advancing said first plunger relative to said funnel to enter the insert within said tube and for thereafter holding said first plunger in engagement with said insert, and means for advancing said second plunger to enter the core within the insert while said first plunger is held in engagement with the insert.

5. Apparatus for assembling an elastic tubular insert between an outer rigid tube and an inner rigid core comprising a support, a guide funnel mounted on said support, an insert engaging plunger of a size to be received within the small end of the funnel, said plunger being axially alined with the funnel and facing the large end of the funnel, a core inserting plunger axially alined with the funnel and facing the small end thereof, said core inserting plunger being mounted for axial movement relative to said insert engaging plunger and toward and away from the same, means for supporting an insert between its engaging plunger and said funnel in axial alinement with the plunger and funnel, means for supporting an insert receiving tube in registry with the small end of said funnel, a tapered core pilot having core engaging means at its large end for holding the core in axial alinement therewith, core engaging means carried by the core inserting plunger for supporting the core and pilot in axial alinement therewith, and actuating means for causing the insert engaging plunger to advance through the funnel to enter the insert into said tube and for then causing said core inserting plunger to move the said pilot through the insert to place the core within the insert while the insert is engaged by said insert engaging plunger.

6. Apparatus for assembling an elastic tubular insert between an outer rigid tube and an inner rigid core comprising a support, a guide funnel mounted on said support for movement in the direction of its axis, a tubular insert engaging plunger of a size to be received within the small end of the funnel, said plunger facing the large end of the funnel and axially alined therewith, a core inserting plunger axially alined with the funnel and facing the small end thereof, said core inserting plunger being movable axially relative to the funnel and having a portion at its end for supporting a core in axial alinement therewith, a tapered core pilot having a core engaging portion at its large end by which it is supported in axial alinement with the core, means for supporting an insert between the funnel and tubular plunger in axial alinement therewith, means for holding an insert receiving tube in registry with the small end of the funnel, and actuating means for moving said guide funnel toward the tubular plunger to enter the insert into the tube and for advancing the core inserting plunger to move said core pilot through the insert into said tubular plunger and enter the core into the insert.

7. Apparatus for assembling an elastic tubular insert between an outer rigid tube and an inner rigid core comprising a support, a guide funnel mounted on said support for movement in the direction of its axis, a tubular insert engaging plunger of a size to be received within the small end of the funnel, said plunger facing the large end of the funnel and axially alined therewith, a core inserting plunger axially alined with the funnel and facing the small end thereof, said core inserting plunger being movable axially relative to the funnel and having a portion of its end for supporting a core in axial alinement therewith, a tapered core pilot having a core engaging portion at its large end by which it is supported in axial alinement with the core, means for supporting an insert between the funnel and tubular plunger in axial alinement therewith, means for holding an insert receiving tube in registry with the small end of the funnel, a stop for limiting the movement of said funnel away from the core inserting plunger, means for moving said funnel to stop engaging position to press said insert against said tubular plunger to enter the insert into the tube, and means for advancing the core inserting plunger while said guide is engaging said stop and said insert engaging plunger is engaged in said insert to move said core pilot through the insert into said tubular plunger and enter the core into the insert.

8. Apparatus for assembling an elastic tubular insert between an outer rigid tube and an inner rigid core comprising a support, a guide funnel mounted on said support for movement in the direction of its axis, an axially movable tubular insert engaging plunger of a size to be received within the small end of the funnel, said plunger facing the large end of said funnel and axially alined therewith, an axially movable core inserting plunger axially alined with the funnel and facing the small end thereof, stop means for limiting the movement of said tubular plunger away from said core inserting plunger, stop means for limiting the movement of said funnel away from said core inserting plunger, means for supporting an insert between said tubular plunger and funnel, means for securing an insert receiving tube to said funnel in registry with the small end thereof, and actuating means for moving said funnel toward said tubular plunger to stop engaging position to press the insert against said tubular plunger and enter the insert into the tube and for then advancing the core plunger toward said tubular plunger to enter the core into the insert while the insert is engaged by said tubular plunger.

9. Apparatus for assembling an elastic tubular insert between an outer rigid tube and an inner rigid core comprising a support, a guide funnel mounted on said support for movement in the direction of its axis, an axially movable tubular insert engaging plunger of a size to be received within the small end of the funnel, said plunger facing the large end of said funnel and axially alined therewith, an axially movable core inserting plunger axially alined with the funnel and facing the small end thereof, means for supporting an insert between the tubular plunger and funnel in axial alinement with the plunger and funnel, means for holding an insert receiving tube in registry with the small end of the funnel, means for moving said funnel toward said tubular plunger, means for yieldably resisting movement of the tubular plunger away from the core inserting plunger, stop means for limiting the movement of the funnel and tubular plunger to position an insert within the tube, and means for advancing the core inserting plunger toward said tubular plunger while said funnel is in stop engaging position.

10. Apparatus for assembling an elastic tubular insert between an outer rigid tube and an inner rigid core comprising a support, a guide funnel mounted on said support for movement in the direction of its axis, an axially movable tubular insert engaging plunger of a size to be received within the small end of the funnel, said plunger facing the large end of said funnel and axially alined therewith, a fluid pressure cylinder having a piston axially alined with the funnel and facing the small end thereof, a tapered core pilot supported on said piston and axially alined with said funnel, springs resisting movement of said tubular plunger and funnel away from said cylinder, stops limiting movements of said plunger and funnel, a crosshead spaced from the small end of said funnel and movable axially of the funnel to clamp an insert receiving tube in registry with the small end of the funnel, a spring interposed between said crosshead and said piston, the latter spring being less yieldable than the funnel spring, means for supporting an insert between the tubular plunger and funnel, and means for supplying fluid under pressure to said cylinder to advance said piston whereby said funnel is moved into engagement with its stop to cause said tubular plunger to force the insert through the funnel into said tube and to thereafter compress the spring between said crosshead and said piston to advance the core pilot through the insert and into said tubular plunger.

11. Apparatus for assembling an elastic tubular insert between an outer rigid tube and an inner rigid core comprising a support, a guide funnel mounted on said support for movement in the direction of its axis, an axially movable tubular insert engaging plunger of a size to be received within the small end of the funnel, said plunger facing the large end of said funnel and axially alined therewith, a fluid pressure cylinder having a piston axially alined with the funnel and facing the small end thereof, a tapered core pilot supported on said piston and axially alined with said funnel, springs resisting movement of said tubular plunger and funnel away from said cylinder, stops limiting movements of said plunger and funnel, a crosshead spaced from the small end of said funnel and movable axially of the funnel to clamp an insert receiving tube in registry with the small end of the funnel, a spring interposed between said crosshead and said piston, the latter spring being less yieldable than the funnel spring, means for supporting an insert between the tubular plunger and funnel, means for supplying fluid under pressure to said cylinder to advance said piston whereby said funnel is moved into engagement with its stop to cause said tubular plunger to force the insert through the funnel to said tube and to thereafter compress the spring between said crosshead and said piston to advance the core pilot through the insert and into said tubular plunger, and means for automatically increasing the pressure on said piston during its stroke.

References Cited in the file of this patent

UNITED STATES PATENTS

| Number | Name | Date |
| --- | --- | --- |
| 1,677,860 | Ferris | July 17, 1928 |
| 1,739,270 | Thiry | Dec. 10, 1929 |
| 1,830,814 | Thiry | Nov. 10, 1931 |
| 1,904,931 | Rosenberg | Apr. 18, 1933 |
| 1,913,933 | Lamborn | June 13, 1933 |
| 1,959,254 | Zerk | May 15, 1934 |
| 1,961,536 | Thiry | June 5, 1934 |
| 2,008,772 | Robertson | July 23, 1935 |
| 2,031,797 | Tarbox | Feb. 25, 1936 |
| 2,117,046 | Welker | May 10, 1938 |
| 2,252,299 | McCoy | Aug. 12, 1941 |
| 2,347,780 | Mermanns | May 2, 1944 |
| 2,446,621 | Thiry | Aug. 10, 1948 |
| 2,492,227 | Korecky | Dec. 27, 1949 |
| 2,550,564 | Hutton | Apr. 24, 1951 |